US012197482B2

(12) United States Patent
Nitsche et al.

(10) Patent No.: US 12,197,482 B2
(45) Date of Patent: Jan. 14, 2025

(54) METHOD AND COMPUTER SYSTEM FOR DETERMINING THE RELEVANCE OF A TEXT

(71) Applicant: CONTEXON GMBH, Berlin (DE)

(72) Inventors: Thomas Nitsche, Berlin (DE); Oxana Nitsche, Berlin (DE); Antonia Düker, Berlin (DE); Raphael Nitsche Hahn, Berlin (DE); Maxim Nitsche Hahn, Berlin (DE)

(73) Assignee: CONTEXON GMBH, Berlin (DE)

(*) Notice: Subject to any disclaimer, the term of this patent is extended or adjusted under 35 U.S.C. 154(b) by 52 days.

(21) Appl. No.: 17/995,530

(22) PCT Filed: Apr. 7, 2021

(86) PCT No.: PCT/EP2021/059021
§ 371 (c)(1),
(2) Date: Oct. 5, 2022

(87) PCT Pub. No.: WO2021/204849
PCT Pub. Date: Oct. 14, 2021

(65) Prior Publication Data
US 2023/0185837 A1   Jun. 15, 2023

(30) Foreign Application Priority Data
Apr. 9, 2020 (DE) .................. 10 2020 109 953.3

(51) Int. Cl.
*G06F 16/30* (2019.01)
*G06F 16/35* (2019.01)
*G06F 40/289* (2020.01)

(52) U.S. Cl.
CPC .......... *G06F 16/35* (2019.01); *G06F 40/289* (2020.01)

(58) Field of Classification Search
None
See application file for complete search history.

(56) References Cited

U.S. PATENT DOCUMENTS

| 8,631,006 B1 * | 1/2014 | Haveliwala ....... G06F 16/24578 707/723 |
| 2014/0067814 A1 * | 3/2014 | Palmert ............... G06F 16/9536 707/738 |

(Continued)

OTHER PUBLICATIONS

International Search Report, mailed Jun. 17, 2021, cited in PCT/EP2021/059021.

(Continued)

*Primary Examiner* — Jau Shya Meng
(74) *Attorney, Agent, or Firm* — Workman Nydegger

(57) ABSTRACT

A method and a computer system for determining the relevance of a text. The method includes: determining the similarity of the text to texts in a portfolio, where the text is compared with each of the texts in the portfolio as part of an individual comparison while determining a similarity value which indicates the similarity between the two texts in each case; assigning the similarity value to one of the two texts in the respectively performed individual comparison which was published at an earlier time or was first captured by a capture system at an earlier time; calculating a relevance value from the similarity values which were determined in the individual comparisons and were assigned to the text, and storing the calculated relevance value and/or transmitting the calculated relevance value to a communication end system via a computer network.

19 Claims, 7 Drawing Sheets

(56) References Cited

U.S. PATENT DOCUMENTS

| | | | | |
|---|---|---|---|---|
| 2017/0011199 A1* | 1/2017 | Oosawa | ............ | G06F 16/51 |
| 2018/0182136 A1* | 6/2018 | Zeyl | ............ | G06F 9/5038 |
| 2019/0273708 A1* | 9/2019 | Vellal | ............ | H04L 51/216 |
| 2020/0242140 A1* | 7/2020 | Xu | ............ | G06F 16/3347 |
| 2021/0089833 A1* | 3/2021 | Anantha | ............ | G06F 18/2178 |
| 2021/0209102 A1* | 7/2021 | Dinh | ............ | G06F 16/24522 |
| 2021/0334464 A1* | 10/2021 | Zhang | ............ | G06F 16/3344 |

OTHER PUBLICATIONS

Borges, Eduardo N et al., "ARGOsearch: an information retrieval system based on text similarity and extensible relevance criteria", 2012 31st International Conference of the Chilean Computer Science Society, IEEE, Nov. 12, 2012, pp. 133-141.

Zhang, Jiayue et al., "Promoting electronic health record search through a time-aware approach", 2013 IEEE International Conference on Bioinformatics and Biomedicine, IEEE, Dec. 18, 2013, pp. 593-596.

Ehsan, Nava et al., "Using a Dictionary and n-gram Alignment to Improve Fine-grained Cross-Language Plagiarism Detection", Proceedings of the 2016 ACM Symposium on Document Engineering, Sep. 12, 2016, pp. 59-68.

Hourrane, Oumaima et al., "Survey of Plagiarism Detection Approaches and Big data Techniques related to Plagiarism Candidate Retrieval", Proceedings of the 2nd International Conference on Big Data, Cloud and Applications, 2017, pp. 1-6.

Huang, Anna, "Similarity Measures for Text Document Clustering", Proc. sixth New Zealand Computer Science Research Student Conference (NZCSRSC2008), Apr. 2008, pp. 49-56.

Whissell, John S. et al., "Effective Measures for Inter-Document Similarity", Proceedings of the 22nd ACM International Conference on Information & Knowledge Management, Oct. 27, 2013, pp. 1361-1370.

Xylogiannopoulos, Konstantinos et al., "Text mining for plagiarism detection: Multivariate pattern detection for recognition of text similarities", IEEE/ACM International Conference on Advances in Social Networks Analysis and Mining (Asonam), IEEE, Aug. 28, 2018, pp. 938-945.

* cited by examiner

METHOD AND COMPUTER SYSTEM FOR DETERMINING THE RELEVANCE OF A TEXT

BACKGROUND

The invention relates to a method and a computer system for determining the relevance of a text.

It is known practice to rate the assessment of the relevance of a text by the extent to which the text is cited in other texts or documents. However, in the case of online publications and other information on the Internet in particular, it is often the case that, apart from explicitly referring to an earlier text by citing it or posting a link, it is rather partially or completely integrated in a new text without a citation. This applies particularly to news (including fake news) relating to particular events or topics. In this respect, there is thus a lack of a criterion for determining the relevance of a text under consideration since it is not possible to discern whether it is an original text or only a derived text. It is also difficult to identify plagiarism.

The present invention is based on the object of specifying a method and a computer system which make it possible to efficiently determine the relevance of a text by comparing it with other texts.

SUMMARY

In a first aspect of the invention, a method for determining the relevance of a text is provided. The method provides for the similarity of the text under consideration to texts in a portfolio to be determined first of all. For this purpose, the text is compared with each of the texts in the portfolio as part of an individual comparison while determining a similarity value, wherein the similarity value indicates the similarity between two texts in each case. In a further step, the similarity value of the respectively performed individual comparison is assigned to at least that one of the two texts which was published at an earlier time or was first captured by a capture system at an earlier time. The similarity values assigned to the text under consideration in this manner during the individual comparisons form the basis for calculating a relevance value. For example, the similarity values are added or multiplied to form a relevance value, wherein the magnitude of the relevance value indicates the relevance of the text.

The calculated relevance value is stored and/or is transmitted to a communication end system via a computer network. For example, the relevance value is stored together with the associated text and/or in a profile of the text.

The relevance of a text or document is, accordingly, calculated on the basis of similarity values which are determined during individual comparisons between the text under consideration and the texts in a portfolio, wherein the time at which the respective texts were published or captured for the first time is taken into account when determining the similarity values.

Aspects of the invention thus make it possible to provide the texts in a portfolio with a ranking, wherein the text with the highest relevance value within the portfolio under consideration is at the top of the ranking. This makes it possible to transparently weight similar texts with regard to their relevance. The solution according to the invention also allows similarity relationships to be identified within a portfolio of texts.

It is pointed out that the feature whereby the relevance value is determined from the similarity values determined during the individual comparisons may comprise a multiplicity of mathematical operations. In the simplest case, the similarity values are added to form a relevance value. However, other ways of deriving the relevance value from the similarity values may also be provided. For example, the relevance value may be alternatively formed from a multiplication of the similarity values or from a combination of addition and multiplication or from any desired formula which has the similarity values as parameters.

One variant of the invention provides for the similarity value of an individual comparison to be assigned only to that text which was published or captured at an earlier time. As a result, the similarity value takes into account the temporal development in the use of a text and similar texts and therefore increases the relevance of those texts which are before other similar or identical texts in terms of time.

Alternatively, provision may be made for the similarity value of an individual comparison to be indeed assigned to both texts in the respective individual comparison, but in this case the similarity value is assigned to that text in the individual comparison which was published or captured at a later time with a lower weighting. In this variant too, although somewhat weakened, the relevance of those texts which are before other similar or identical texts in terms of time is increased.

The following is noted with respect to the portfolio of texts under consideration. The texts in a portfolio may but need not have matching keywords. In the extreme case, the relevance value of each document may be equal to zero. Configurations provide for the texts in a portfolio to be linked to one another via at least one matching keyword or the compliance with another predefined similarity measure. This may be the case, for example, if the portfolio is filtered from a larger portfolio (for example by means of a search engine) in order to carry out the relevance check on a smaller number of texts.

However, the portfolio may generally contain any desired documents. If there is no similarity between two documents, for example if they do not share two keywords, the similarity is equal to zero.

The similarity value of two documents is symmetrical, that is to say the similarity value between two texts which was determined during an individual comparison is the same for both texts. According to the invention, however, the similarity value is assigned only to one of the texts when calculating the relevance value or is assigned more strongly to one of the texts.

Text in the sense of the present invention is understood as meaning any sequence of words which are separated by one or more separators (space, full stop, comma, etc.) or whose separation (for example Chinese) results from the meaning of the text. One example is: "Everything will be fine". A text in the sense of the present invention may be a document or a part of a document.

The time at which a text was first published or captured results, for example, from corresponding metadata stored with the text or assigned to the latter. For example, the texts displayed as part of an RSS feed each contain the date and time as a time stamp. Moreover, if they are not included in the text or its metadata, the date and time can be determined, for example, from when a text was first captured using a system which preferably carries out periodic capture. In particular, it is the case that a document, for instance on a computer or on the Internet, has a creation date and, in the event of a change, a change date. For example, the creation date of a document or text is used as an assigned time stamp which is then included in the calculation of the relevance value according to the invention. If a document does not have a generic time stamp, the time at which the document was first captured, for instance by a periodically crawling web crawler, can be used as the relevant time or as a time stamp. If documents are captured using an RSS feed, for example, a time stamp is assigned to a text, as mentioned. Alternatively, the earliest capture date may again be used as a time stamp.

In one embodiment variant, the method according to the invention is used to better rank search results from a search engine or to rank the results of a search query. Search results are generally ranked according to the relevance to a search text. The solution according to the invention additionally allows ranking in accordance with the originality of a text which is indicated by the relevance value determined according to the invention. In this case, the accumulated similarity values or the summation of all determined similarities of a document or text to all other documents or text in a portfolio is/are considered to be the relevance value. This relevance value (SRank—"Similarity Rank") assigned to the document at a point in time is stored in the document and is used when ranking a hit list of a search operation. The higher the SRank of a document, the higher it is placed in the hit list.

For example, a ranking list or a ranking is provided by a search engine in response to a search query which contains, as a search term, at least one keyword contained in the text. In this case, provision may be made for the relevance value to be only one of the criteria of the search engine for the order in the hit list; further parameters or individual criteria are therefore included, in addition to the relevance value, in the determination of the order of the hit list.

Further applications relate to ranking when classifying news presented to a reader, wherein this may possibly take place as part of a search query, that is to say constitutes an application of ranking with a search engine. In this case, the first news item in a news chain is relevant since it presents the oldest text or the text with the greatest originality. News articles are typically ranked according to their recentness. The method according to the invention allows the relevance value to be used to identify influencing articles which form the origin of a news chain.

A further exemplary application relates to the ranking of working papers within an organization.

If the similarity of the text to a text in the portfolio, which is determined as part of an individual comparison, exceeds a threshold value, one configuration of the invention provides for the similarity value to be incremented by an additional value. In this case, the similarity value incremented by the additional value is assigned at least to that one of the two texts in the performed individual comparison which was published at an earlier time. In this case, embodiment variants are provided in which only the similarity value of the document published earlier in terms of time is incremented or the similarity value of the document published earlier in terms of time is incremented to a greater extent than the other similarity value. Furthermore, provision may be made for a higher degree of similarity to result in a higher increment.

This configuration increases the relevance value of texts having a high degree of similarity to other texts, whereas texts with a low degree of similarity are less important. This forms a cluster of relevant texts and it is more easily possible to determine the relevant texts and to rank them among one another in the case of a large number of texts.

A similar result can be achieved if, provided that the similarity of the text to a text in the portfolio, which is determined as part of an individual comparison, falls below a threshold value, the similarity value is set to zero, that is to say the result of this individual comparison is not included in the determination of the relevance value. A further configuration of the invention provides for this.

A possible application involves, for example, tracking news, in particular so-called "fake news" on the Internet. Detected cluster formation may illustrate that "fake news" has possibly been spread by a group of users in a short time in related texts.

A further exemplary embodiment provides for the determined relevance value of a text to be divided by the number of texts in the portfolio or by the number of texts in the portfolio for which the respective individual comparison has resulted in a similarity value that is not equal to zero, or for the relevance value to be modified by this number in another manner. A relevance value modified in this manner is substantially independent of the number of texts in the portfolio.

The method according to the invention is fundamentally transparent with respect to the method used to determine the similarity of two texts. Any desired methods may fundamentally be used for this purpose.

One configuration of the invention provides for the determination of the similarity of the text to a text in the portfolio to comprise the following steps of:

determining keywords of the respective text, determining a keyword relevance value for each of the determined keywords, which keyword relevance value indicates the relevance of the keyword in the text respectively under consideration, and deriving a similarity value from the number of keywords matching in the two texts and the keyword relevance values assigned to these keywords.

Keywords are therefore determined in the two texts and are weighted so as to form a keyword relevance value and a similarity value is derived from the matching keywords and their weightings.

A keyword in the sense of the present invention may be a multiplicity of entities in this case. According to one configuration, keywords of a text are the names and/or the nouns contained in the text. The names and nouns in a text are therefore determined as keywords, for example. However, instead of names and/or nouns, other characterizing words of a text may also be used. In this case, provision may be made for the word stems of the respective names and nouns or of other keywords, which are also referred to as "lemmas" below, to be taken into account as keywords. Examples are:

Example of lemma1: Lemma(ging)=gehen

Example of lemma2: Lemma(Hauser)=Haus

Example of lemma3: Lemma(went)=go

According to this embodiment variant, the lemmas are therefore used as keywords.

According to a further exemplary embodiment, keywords of a text are n-grams of the respective text. An n-gram is a partial sequence of letters of a word or of a plurality of successive words. One example is: the German word "Schach" contains the triple n-grams: "sch", "cha", "hac" and "ach". In this case, n-grams may also go beyond word limits.

It is also pointed out that keywords need not necessarily occur in the text under consideration itself. If this is not the case, a keyword is a characterizing feature of the text which can be derived from or assigned to the latter. An example of a characterizing feature in this sense is as follows:

Example of feature1: A text relating to the company Apple may be characterized with the feature "personal computer" even though this term does not occur in the text.

With this definition, n-grams are also features in the sense mentioned.

Characterizing features are stored, for example, together with keywords or text parts or complete texts in a database, with the result that they can be uniquely assigned to a text.

One configuration of the invention provides for the frequency of the keywords in the respective text to be determined as the keyword relevance, wherein a frequency value is assigned to each keyword as a keyword relevance value. Accordingly, the similarity value is determined for this case from the number of keywords matching in the two texts and the frequency values assigned to the respective keywords.

A further configuration provides for the tf-idf measure to be used as the keyword relevance value, wherein the keyword relevance value is equal to the product of a frequency value assigned to the respective keyword with the inverse text frequency in the texts in the portfolio. The tf-idf measure is fundamentally known. The component "tf" indicates the search word density or frequency of occurrence in the text under consideration. The component "idf" denotes the inverse document frequency which indicates the specificity of a keyword for the entire set of texts under consideration in the portfolio. This is based on the consideration that a matching occurrence of rare terms is more meaningful for the relevance and accordingly increases the similarity value and therefore the relevance value to a greater extent.

A further configuration provides for a normalized profile of the respective text to be formed by using normalized keyword relevance values as keyword relevance values, which normalized keyword relevance values are generated from the keyword relevance values by dividing them by a normalization factor. In this case, provision is made, for example, for the normalization factor to be equal to the maximum keyword relevance value occurring in a text under consideration (for example equal to the highest frequency value of the text). There are numerous normalization methods which can be used.

When using normalized profiles, one configuration provides for a similarity value for two texts in an individual comparison to be derived from the number of matching keywords and the normalized keyword relevance values assigned to the respective keywords by determining the sum of the mean values of the normalized keyword relevance values of the matching keywords. If the keyword relevance values are frequency values, for example, the similarity value is determined from the sum of the mean values of the normalized frequency values of the matching keywords.

A further embodiment variant provides for a filtered profile of the respective text to be formed from the normalized profile of the respective text by using filtered keyword relevance values as keyword relevance values, which filtered keyword relevance values are formed from the normalized keyword relevance values by filtering the normalized keyword relevance value with a threshold value. In this case, the normalized keyword relevance value is retained only if it is above the threshold value and is otherwise set to zero.

When using normalized profiles, one configuration provides for a similarity value for two texts in an individual comparison to be derived from the number of matching keywords and the filtered keyword relevance values assigned to the respective keywords by determining the sum of the mean values of the filtered keyword relevance values of the matching keywords. Since the filtered keyword relevance values, provided that they are below the threshold value, are set to zero, only those keywords which are present in both texts with a high degree of relevance are included in the similarity value.

If a keyword is a characterizing feature of a text which can be derived from or assigned to the latter without occurring in the text itself, provision may be made for the relevance of this keyword, that is to say its keyword relevance value, to be or have been externally determined. The relevance may be based on the importance of the keyword, for example. If, for example as a characterizing feature of a text, the name of its author is assigned as a keyword, provision may be made for this keyword to always have a high keyword relevance value of 1.0 or 0.75, for example, after normalization.

A further configuration of the invention provides for the texts in the portfolio to be stored in a database, wherein at least the following are stored for each text: the time at which the text was first published and a profile of the text. In this case, the profile of the text was produced by capturing keywords of the respective text and determining a keyword relevance value for each of the determined keywords, which keyword relevance value indicates the relevance of the keyword in the text. This can be carried out in the described manner. Accordingly, normalized keyword relevance values and/or filtered keyword relevance values can be stored in the database as keyword relevance values.

In order to determine the similarity of two texts, the profile is retrieved from the portfolio and a similarity value is formed from the number of matching keywords and the keyword relevance values assigned to the respective keywords. In this case, the present invention comprises both configurations in which the text whose relevance is to be determined is part of the portfolio of texts and configurations in which the text whose relevance is to be determined is not part of the portfolio of texts. In the first case, the profile of the text whose relevance is to be determined is already stored in the database, with the result that it can be retrieved from the database, just like the profiles of the other texts in the portfolio. In the second case, a profile of this text is generated, for example, and is stored in the database together with the time at which the text was first published.

A further configuration provides for the method to be applied to all texts in the portfolio, wherein a relevance value is determined for each text in the portfolio. The relevance values may be stored together with the texts in the database, with the result that they can be immediately retrieved.

As explained, text in the sense of the present invention is understood as meaning any sequence of words which are separated by one or more separators (space, full stop, comma, etc.) or whose separation results from the meaning of the text. A text in the sense of the present invention may therefore also be a text part (a paragraph or a chapter) of a more comprehensive document, for example an article or a book. Such a text part is also a text in the sense of the present invention. It is then possible for a relevance value to be determined for a plurality of texts which come from the same document. In such a case, provision may be made for an overall relevance value of the document to be calculated from the individual relevance values of the texts or text parts, for example by adding the individual relevance values. Such an overall relevance value indicates more clearly if a plurality of paragraphs or chapters of a document are used in more recent texts, as is the case for plagiarism, for example.

Alternatively, a relevance value may be determined from the outset on the basis of the entire document which comprises a plurality of text parts. The entire document is then the text in the sense of the invention.

According to one exemplary embodiment, the time at which a text was first published is defined by a time stamp of the text. This is, for example, the creation date of the text. The time at which a text was first captured by a capture system is defined, for example, by the time at which the text was first captured by a web crawler.

According to a further aspect of the invention, the invention relates to a computer program having program code for carrying out the method steps as claimed in claim 1 when the computer program is executed in a computer. The computer software may be developed to the effect that it, in conjunction with a processor or computer, implements all embodiment variants of the invention as claimed in the claims.

According to a further aspect of the invention, the invention relates to a method for determining the relevance of a text, which method comprises the steps of:

transmitting a text or data identifying the text from a communication end system to a computer system which manages a portfolio of texts stored in a database of the computer system, wherein the time at which the text was first published or was first captured by a capture system and a profile are stored in the database for each text, wherein the profile has been created on the basis of keywords of the respective text and keyword relevance values assigned to said keywords, prompting the computer system to check whether the received text is contained in the portfolio, if this is not the case, creating, by means of the computer system, a profile of the text and storing the profile and the time at which the text was first published in the database, prompting the computer system to determine the similarity of the text to texts in the portfolio, wherein the text is compared with each of the texts in the portfolio as part of an individual comparison while determining a similarity value which indicates the similarity between the two texts in each case, wherein, in order to determine the similarity value of two texts, the profile stored in the database is retrieved and a similarity value is formed from the number of matching keywords and the keyword relevance values assigned to these keywords, wherein the determined similarity value is assigned at least to that one of the two texts in the respectively performed individual comparison which was published or captured at an earlier time, calculating a relevance value from the similarity values which were determined in the individual comparisons and were assigned to the text, storing and/or transmitting the determined relevance value from the computer system to the or another communication end system.

A further aspect of the invention relates to a computer system for determining the relevance of a text, comprising:

means for determining the similarity of the text to texts in a portfolio, wherein the text is compared with each of the texts in the portfolio as part of an individual comparison while determining a similarity value which indicates the similarity between the two texts in each case, means for assigning the similarity value to at least that one of the two texts in the respectively performed individual comparison which was published at an earlier time, wherein the means are designed to assign the similarity value of an individual comparison only to that text which was published or captured at an earlier time, or to assign the similarity value of an individual comparison to both texts in the respective individual comparison, wherein the similarity value is assigned to that text in the individual comparison which was published or captured at a later time with a lower weighting, and means for calculating a relevance value from the similarity values which were determined in the individual comparisons and were assigned to the text.

The means comprise, for example, a nonvolatile computer-readable storage medium which stores instructions for operating the computer system, wherein the instructions, when executed by one or more processors of the computer system, prompt the one or more processors to carry out operations in the computer system which perform the functions provided by said means.

In this case, provision may be made for the computer system to interact with a database which has a portfolio of texts for each of which at least a time at which the text was first published and a profile are stored. In this case, the profile has been created on the basis of keywords of the respective text and keyword relevance values assigned to said keywords. The means for determining the similarity of the text to texts in the portfolio determine the similarity on the basis of the profiles stored in the database.

BRIEF DESCRIPTION OF THE DRAWINGS

The invention is explained in more detail below on the basis of a plurality of exemplary embodiments with reference to the figures, in which.

DETAILED DESCRIPTION

Figure 1:
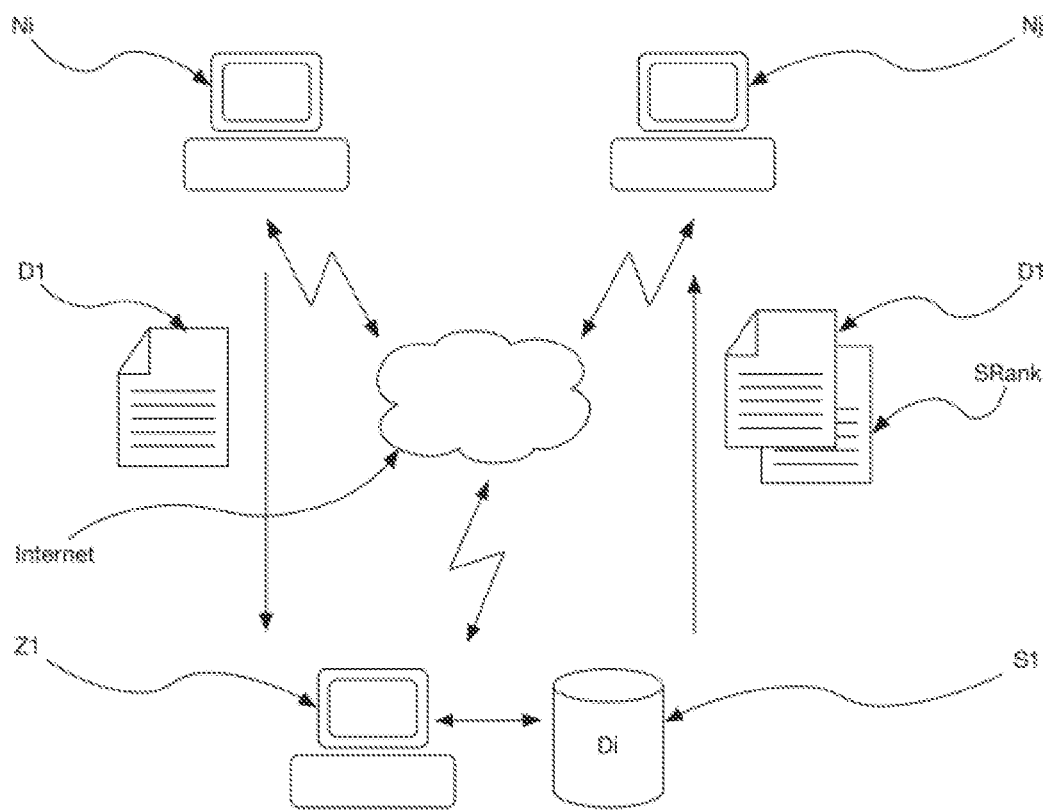
FIG. 1 shows a communication infrastructure which is suitable for carrying out a method for determining the relevance of a text.

FIG. 1 shows a communication infrastructure having a plurality of communication end systems Ni, Nj and a computing unit Z1. The communication end systems Ni, Nj can be operated by users (not illustrated) and/or act autonomously. They can be connected to the computing unit Z1 via at least one communication connection, for example a telecommunications connection and/or a computer connection, for example via the Internet or an intranet. The communication end systems Ni, Nj are in the form of a PC, a laptop, a tablet computer or a smartphone, for example.

The computing unit Z1 may communicate with a multiplicity of users or communication end systems Ni, Nj. It is formed by a server on the Internet, for example. The computing unit Z1 is assigned a memory unit S1 which comprises a nonvolatile memory.

The users or communication terminals Ni, Nj used by the latter create or identify texts or documents D1 and transmit them to the computing unit Z1. The terms "text" and "document" are used as synonyms below (even though situations are also conceivable in which a text is merely a part of a document). For each of the received texts D1, the computing unit Z1 creates a profile and stores it together with the texts D1 in the memory unit S1. Alternatively, only the profiles are stored. Alternatively or additionally, the computing unit Z1 acts as a web crawler and automatically searches or crawls the Internet or an intranet for the purpose of searching for and identifying texts. In this case, depending on the application, the search may be restricted to a particular type of texts, for example news texts or texts relating to a particular technical or scientific or political topic.

The information stored for a text in the memory unit S1 comprises at least the following information: the time at which the text was first published or was first captured by a capture system and a profile of the text. With regard to the time at which the text was first published or captured, provision may be made for the documents D1 to each have a time stamp which indicates when the documents were first published or captured by a capture system. The time stamp may be directly assigned to the documents, for instance in the form of metadata of the document, with the result that this information can be easily captured for this case and is entered in the memory unit S1. Alternatively, in order to determine the time at which the text was first published or captured, provision may be made for the computing unit Z1 to automatically carry out a search on the Internet and to evaluate data from which the time in question arises. As an alternative, provision may also be made for the time to be entered by a user via a communication interface using a communication end system Ni, Nj.

The time may comprise the date and the time of day on the date on which the text was first published or captured. If the time of day cannot be determined, the time contains at least the date.

The profile of the text comprises keywords of the respective text and keyword relevance values for the keywords of the text, wherein the keyword relevance value indicates the relevance of the respective keyword in the text respectively under consideration, as is also explained in more detail. The profile may also comprise further information relating to the respective text, for example author, publisher, etc.

The method for determining the relevance of a text D1 takes place such that a particular text D1 is compared with further texts Di which, or the profiles of which, are stored in the memory unit S1. In this case, the text D1 may have been transmitted, for example, by a user to the computing unit Z1 via a communication end system Ni, Nj and a data transmission method. Alternatively, the text is only identified by the user without being transmitted, wherein the text, including its profile, is already contained in the memory unit S1. It is likewise conceivable for the method to be automatically carried out by the computing unit Z1 for each text which is captured or crawled by the computing unit Z1.

By means of individual comparisons with texts D1 in a portfolio which is stored in the memory unit S1, the computing unit Z1 determines a relevance value of the text D1, which is also referred to below as the SRank value or simply as the SRank. The method used for this purpose is explained schematically below with reference to FIG. 2.

In a first step 201, the similarity of the text to texts in a portfolio is determined. For this purpose, the text is compared with each of the texts in the portfolio as part of an individual comparison while determining a similarity value which indicates the similarity between the two texts in each case. The texts in the portfolio are stored in the memory unit S1. The method for determining a similarity value may fundamentally be carried out in any desired manner. An example of such a method is explained using FIG. 4.

In a further step 202, the determined similarity value is assigned at least to that one of the two texts in the respectively performed individual comparison which was published at an earlier time or was first captured by a capture system at an earlier time. For this purpose, according to step 203, embodiment variants may provide for the similarity value of an individual comparison to be assigned only to that text which was published or captured at an earlier time. This may mean that, if the text under consideration was published or first captured later than a comparison text, it is not assigned a similarity value or is assigned the similarity value of zero.

An alternative in step 203 provides for the similarity value of an individual comparison to be assigned to that text which was published or captured at an earlier time with a greater weight.

According to step 204, the similarity values which were determined in the individual comparisons and were assigned to the text under consideration are added to form a relevance value or SRank. The magnitude of the relevance value indicates the relevance of the text. Addition of the similarity values to form a relevance value SRank should only be understood here as meaning an example of a derivation of the relevance value from the similarity values.

Referring to FIG. 1 again, the determined SRank of the examined text D1 is stored in the memory unit S1 together with or as part of the determined profile of the text D1. If the profile of the text D1 was already contained in the memory unit S1, only the SRank is additionally stored as part of the profile. Furthermore, the SRank of the document D1 under consideration can be transmitted to a communication end system Ni, Nj if necessary, as illustrated in FIG. 1. This can be carried out with or without the document D1.

Accordingly, one embodiment variant provides for a text D1 to be initially transmitted from a communication end system Ni, Nj to the computing unit Z1, wherein the computing unit Z1 manages a portfolio of profiled texts which are stored in the memory unit S1. As a result of the initiated query, the computing unit Z1 is prompted to check whether the received text D1 is contained in the portfolio. If this is not the case, a profile is created for the text D1 and is stored in the memory unit S1 together with the time at which the text was first published or made available. Otherwise, it is possible to resort to the information which has already been stored. The computing unit Z1 is now prompted (on account of the query which has been made) to determine the similarity of the text to texts in the portfolio, wherein the text D1 is compared with each of the texts D1 in the portfolio as part of an individual comparison, while determining a similarity value which indicates the similarity between the two texts in each case, using the method explained with reference to FIG. 2.

The determined or stored profile is therefore retrieved for two texts in each case and a similarity value is formed from the number of matching keywords and the keyword relevance values assigned to these keywords. The similarity values which were determined in the individual comparisons and were assigned to the text D1 are added to form a relevance value (the SRank), the magnitude of which indicates the relevance of the text D1. The determined relevance value may be made available to the querying communication end system or to another communication end system Ni, Nj and/or may be stored.

In this case, numerous modifications of the method are possible. A first modification provides for information which uniquely identifies the text D1 to be transmitted to the computing unit Z1, rather than this text. A further modification provides for the relevance values (SRanks) to already be available in the memory unit S1 for all documents or to have already been calculated by the computing unit Z1, with the result that only the SRank stored in the memory unit S1 must be communicated in response to a query regarding the relevance of a document.

Figure 3:
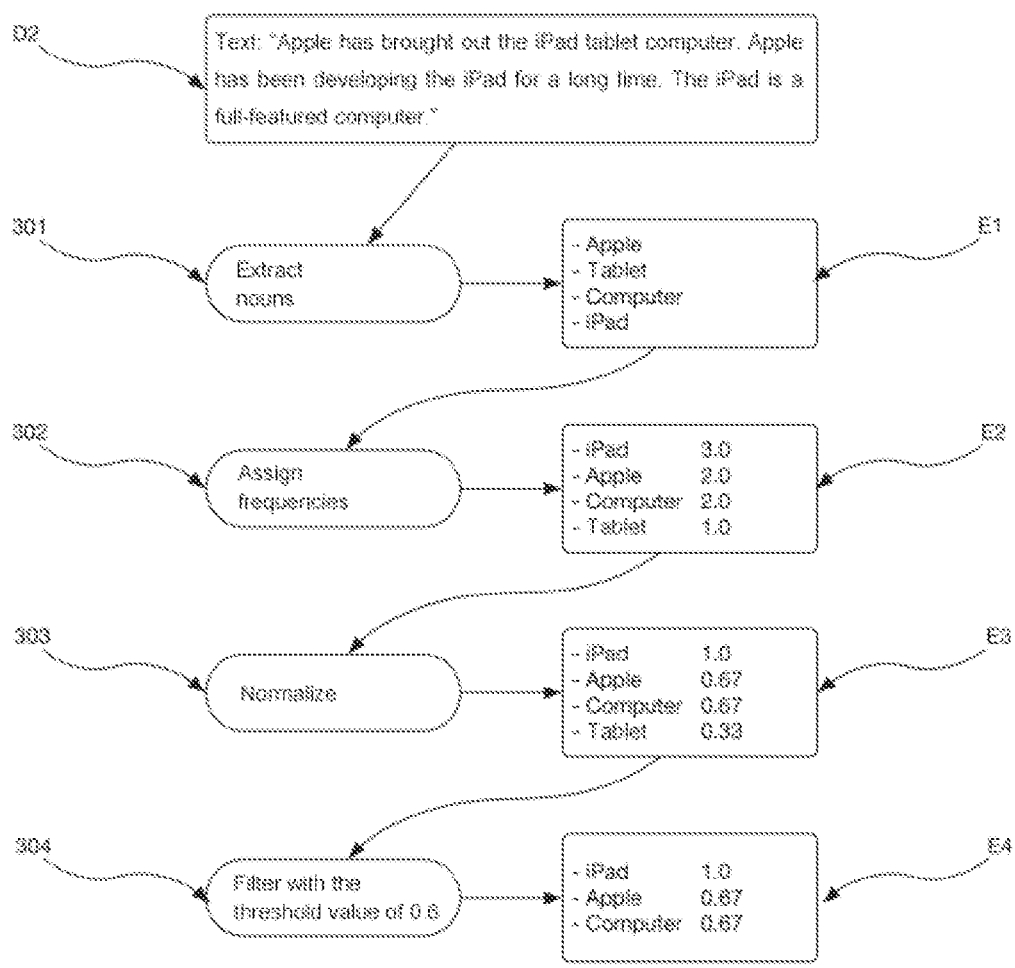
FIG. 3 shows an exemplary embodiment of a method for creating a normalized profile of a text by capturing keywords of the text and assigning a normalized and filtered keyword relevance value to each keyword.

FIG. 3 shows, by way of example, how a profile is created for a given text, which profile is used as the basis for determining a similarity value when comparing the text with another text.

In this case, the following sample text D2 is considered to be the text/document:

"Apple has brought out the iPad tablet computer. Apple has been developing the iPad for a long time. The iPad is a full-featured computer."

The sample text D2 has the date of 4 Oct. 2019 as the relevant time.

In a first step 301, keywords of the text D2 are identified and extracted. In the present case, all names and nouns are considered to be keywords of the text: this results in a raw profile E1. In the example under consideration, this consists of the words "Apple, tablet, computer, iPad".

In a second step 302, the frequencies of the keywords contained in the text D2 are determined and are assigned to the text as relevance. This results in a raw profile E2 with frequencies which represent keyword relevance values:

Profile with frequencies: iPad—3.0; Apple—2.0; computer—2.0; tablet—1.0.

In a third step 303, the keyword relevance values are normalized. The result is a normalized profile E3 with normalized frequencies which represent normalized keyword relevance values.

Normalized profile: iPad—1: Apple—0.67; computer—0.67; tablet—0.33.

In a fourth step 304, the normalized keyword relevance values are filtered. The result is a filtered profile E4. The filtering is carried out by means of a comparison with a threshold value which is 0.6 in the example under consideration. Normalized keyword relevance values which are above the threshold value are dropped.

Filtered profile: iPad—1; Apple—0.67; computer—0.67.

Provision is therefore made for the frequency with which keywords of the text occur in the text to be assigned to said keywords as relevance. The corresponding keyword relevance values are normalized and filtered using a threshold value. The threshold value of 0.6, as indicated in the above example, should merely be understood as exemplary in this case.

The threshold value may fundamentally be at any desired point in the range above 0 and below 1.

Figure 4:
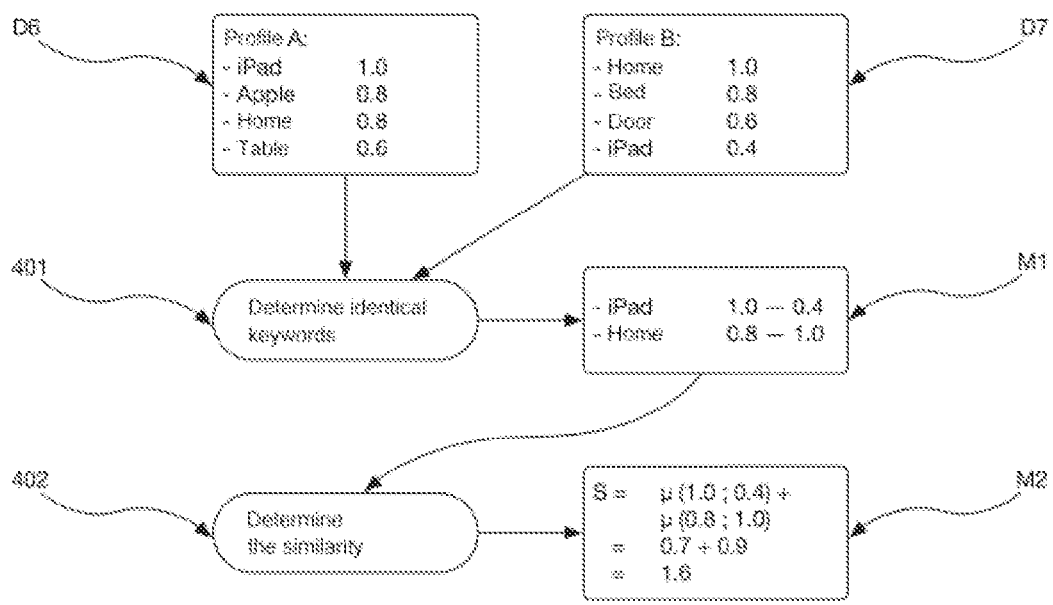
FIG. 4 shows an exemplary embodiment of a method for determining the similarity of two texts, each of which has been assigned a profile according to FIG. 3, wherein a similarity value of the two texts is determined by determining the sum of the mean values of the normalized and filtered keyword relevance values of the keywords matching in both texts.

After determining the profile, the similarity between two texts in each case should now be determined on the basis of the profile. FIG. 4 shows an example of this. According to said FIG., a first text D6 is provided, from which a normalized and filtered profile A was formed in the manner described in FIG. 3, said profile having the following keywords and keyword relevance values: keywords: iPad, Apple, home, table. Assigned keyword relevance values: 1.0, 0.8, 0.8, 0.6. A second text D7 is also provided, from which a normalized and filtered profile B was formed in the manner described in FIG. 3, said profile having the following keywords and keyword relevance values: keywords: home, bed, door, iPad. Assigned keyword relevance values: 1.0, 0.8, 0.6, 0.4.

The similarity or the similarity value is determined from the two profiles A, B from the matching keywords and the filtered keyword relevance values assigned to the respective keywords by determining the sum of the mean values of the filtered keyword relevance values of the matching keywords.

Accordingly, in a first step 401, the same keywords contained in the two profiles A, B are determined. In the example under consideration, these are the keyword "iPad" which is contained in the text D6 with a filtered keyword relevance value of 1.0 and in the text D7 with a keyword relevance value of 0.4, and the keyword "home" which is contained in the text D6 with a filtered keyword relevance value of 0.8 and in the text D7 with a filtered keyword relevance value of 1.0; see intermediate result M1 in FIG. 4 which indicates the profile matches.

In step 402, the similarity value S is determined by determining the sum of the mean values of the matching keywords for these keywords and keyword relevance values; see calculation M2 in FIG. 4. In the example under consideration, the value of 1.6 therefore results as the similarity value S.

In this case, provision may be made, during a comparison, for a similarity value to be assigned only to that document which was published at an earlier time or was first captured by a capture system at an earlier time. If the document D7 is more recent than the document D6 in this sense, for example, only the document D6 is assigned a similarity value which is included in the calculation of a relevance value which is subsequently carried out. If, in contrast, the document D6 is more recent than the document D7, it is only assigned the similarity value of zero.

An alternative provides, during a comparison, for a similarity value to be assigned to that text in the individual comparison which was published at an earlier time or was first captured by a capture system at an earlier time with a greater weighting. For example, the determined similarity value of the individual comparison is weighted with a factor of 2 for the older document and is weighted with a factor of 0.5 for the more recent document. In the example considered above, if the document D6 was published or made available earlier and is therefore the older document, a similarity value of 2*1.6=3.2 results for the document D6 and a similarity value of 0.5*1.6=0.8 results for the more recent document D7.

A further embodiment variant provides for the similarity value determined in an individual comparison to be compared with a threshold value and, if the similarity value is above the threshold value, for the similarity value to be incremented by an additional value. This incremented similarity value is then assigned at least to the older of the two texts. The incrementation may be carried out by a factor or a summand. There are two examples of this. In a first example, incrementation by a factor of 3 is carried out. In the example considered above, if the document D6 was published or made available earlier, a similarity value of 3*1.6=4.8 therefore results for the document D6. In a second example, incrementation by a fixed value, for example the value 1.5, is carried out. In this case, in the example considered above, if the document D6 was published or made available earlier, a similarity value of 1.6+1.5=3.1 results for the document D6.

A further embodiment variant provides for the similarity value determined in an individual comparison to be compared with a threshold value and, if the similarity value is below the threshold value, for the similarity value to be set to zero. This again filters out documents for which the determined similarity value is below a predefined threshold of 0.5, for example.

Figure 2:
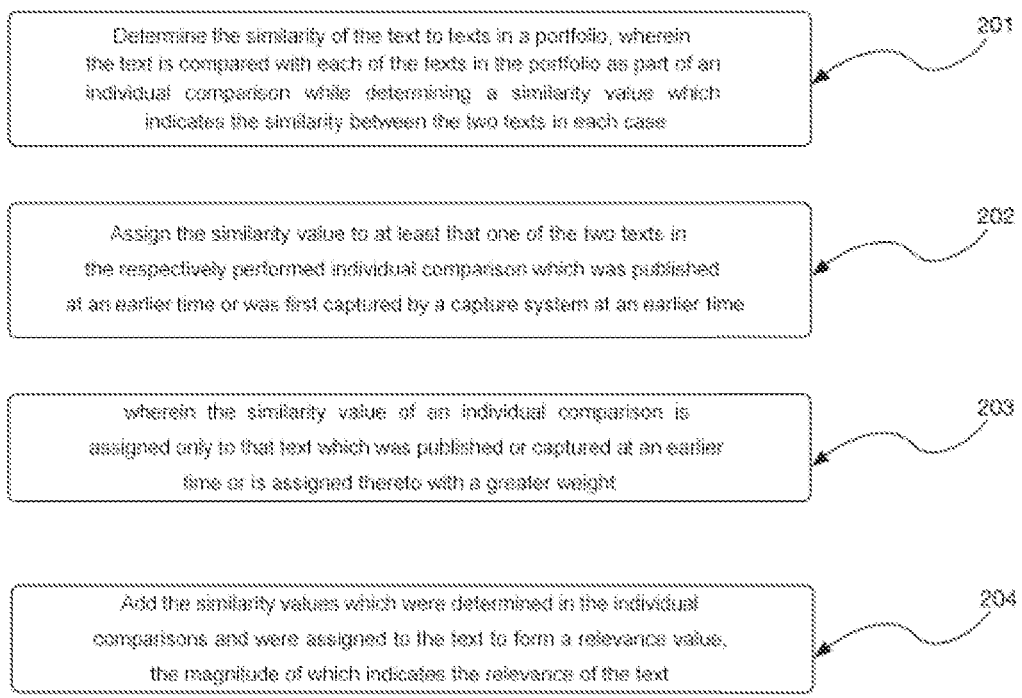
FIG. 2 shows a flowchart of a method for determining the relevance of a text.

In order to determine the SRank of a document, as explained with reference to FIG. 2, an individual comparison of the text under consideration, whose SRank is to be determined, with all texts in the portfolio under consideration is carried out. The similarity values respectively assigned to a document under consideration as part of the respective individual comparisons are added to form the relevance value or SRank of the document.

This is explained using an example on the basis of the exemplary embodiment in FIG. 3.

It shall be assumed that, in addition to the text D2 in FIG. 3 (published on 4 Oct. 2019), there are also three further texts D3, D4, D5 which together represent the texts in a portfolio under consideration.

A profile containing the keywords and the normalized and filtered keyword relevance values is created for each of the further texts D3, D4, D5.

The text D3, first published on 4 Dec. 2019, reads: "Apple Computer has brought out the iPad. The iPad is a tablet computer." The following therefore results as a profile with frequencies: iPad—2; computer—2; Apple—1; tablet—1. The following results as a normalized profile: iPad—1; computer—1; Apple—0.5; tablet 0.5. The following results as a filtered profile with the threshold value of 0.6: iPad—1; computer—1.

The text D4, first published on 4.13.2019, reads: "The iPad from Apple is here. The iPad is an innovative product." The following therefore results as a profile with frequencies: Apple—1; iPad—2; Apple—1; product—1. The following results as a normalized profile: iPad-1; Apple—0.5; product—0.5. The following results as a filtered profile with a threshold value of 0.6: iPad—1.

The text D5, first published on 4 Jan. 2019, reads: "Microsoft is a company. Microsoft is based in Seattle." The following therefore results as a profile with frequencies: Microsoft—2; Seattle—1; company—1. The normalized profile is: Microsoft—1; company—0.5; Seattle— 0.5. The filtered profile is: Microsoft—1.

The similarity values between the documents D2, D3, D4, D5 are now determined in accordance with the procedure explained in FIG. 4. The following result in this case:
(A) Similarity value for documents D2, D3: (iPad: (1+1)/2)+(computer: (1+0.67)/2)→1.83
(B) Similarity value for documents D2, D4: (iPad: (1+1)/2)→1
(C) Similarity value for documents D2, D5: (−)→0
(D) Similarity value for documents D3, D4: (iPad: (1+1)/2)→1
(E) Similarity value for documents D3, D5: (−)→0
(F) Similarity value for documents D4, D5: (−)→0

The relevance value or SRank is now determined from these similarity values, wherein said relevance value can be determined for all of these documents. The following SRanks result.

The document D2 receives the SRank from the sum of (A) and (B)→1.83+1=2.83. SRank (D2)=2.83

Documents D3 and D4 do not receive any similarity value from the similarity to document D2 since they were published later.

Document D3 receives an SRank from (D)→1. SRank (D3)=1.

Document D4 does not receive any value from the similarity to document D3 since it was published later: SRank (D4)=0.

The document D5 does not receive any similarity value whatsoever since it is not similar to any of the other documents. SRank (D5)=0.

The processes of determining the similarity values can be varied in this case as explained with reference to FIG. 3, for example by means of other threshold values when filtering the keyword relevance values, by carrying out particular weighting of the older document, and/or by incrementing a similarity value if it exceeds a threshold value.

As a result, the document D2 has a considerably higher relevance value than the documents D3, D4 and D5. The document D3 is still somewhat more relevant than the documents D4 and D5. The document D4 does not have any relevance value since it was published later than the other similar documents. The document D5 does not have any relevance value since it is not similar to any other document.

When determining the keywords, the word stems or lemmas of the names and nouns may also be extracted instead of the names and nouns. The keywords may fundamentally also be determined in a manner other than using names and nouns, for example may be n-grams of the text.

Finally, a further method variant is discussed. The method variant considers the classification of a new document in a predefined portfolio with gradual SRank determination. There are an index and an inverse index for the documents in the portfolio, wherein the index assigns particular keywords to a document and the inverse index allows the documents containing a particular keyword to be identified. For example, the memory unit S1 in FIG. 1 has an index and an inverse index of the documents contained in it. It is also assumed that each document in the portfolio already has an SRank. In contrast, the document to be newly classified does not yet have an SRank.

The following steps are carried out:
(1) Determine a profile with keywords and with normalized and filtered keyword relevance values for the document N to be newly classified;
(2) On the basis of the keywords of the document N to be newly classified and the inverse index, search the portfolio and generate a hit list, wherein the hit list indicates the documents in the portfolio which have at least one keyword matching at least one of the keywords of the document N to be newly classified (for this purpose, a search for only one keyword of the document to be newly classified can be initially carried out using the inverse index and a search for a respective further keyword of the document to be newly classified can then be carried out);
(3) Determine the similarity value for each pair which results from each document in the hit list and the document N to be newly classified in each case;
(4) Determine the relevance value SRank from the similarity values for the document N to be newly classified;

(5) Insert the document N into the portfolio, the index and the inverse index;

(6) If the SRank of the documents in the portfolio has changed on the basis of the individual comparison with the document N to be newly classified, update the SRanks of the documents in the portfolio.

In this case, it is pointed out that, when determining the relevance value SRank of the document N to be newly classified, provision may be made in embodiment variants for only those similarity values determined in the individual comparisons for which the similarity value between the document N to be newly classified and the document in the portfolio exceeds a stipulated threshold value, for example a threshold value of 0.5, to be added or to contribute to determining the similarity value. There is therefore then a hit list, on the basis of which the SRank is determined. Said threshold value may represent an additional threshold value which is used in addition to the threshold value used to filter the normalized keyword relevance values when determining the similarity value.

The method explained using exemplary embodiments makes it possible to effectively process and compare texts in natural language, wherein paraphrased texts can also be compared with one another for similarity. A similarity between two texts can also be determined in this case in texts of different lengths. For example, short search phrases can be compared with comprehensive texts. Since many texts contain names and technical terms, the described determination of similarity values and of a relevance value can also be carried out across languages. Alternatively, a foreign-language text is first of all translated into the language of the text for which a similarity is intended to be determined using a computer translation.

An exemplary use of the described method relates to the determination of plagiarism. A further exemplary use relates to the ranking of newspaper articles with respect to their relevance, wherein the authors and publishers behind said articles are also implicitly ranked hereby.

Figure 5:
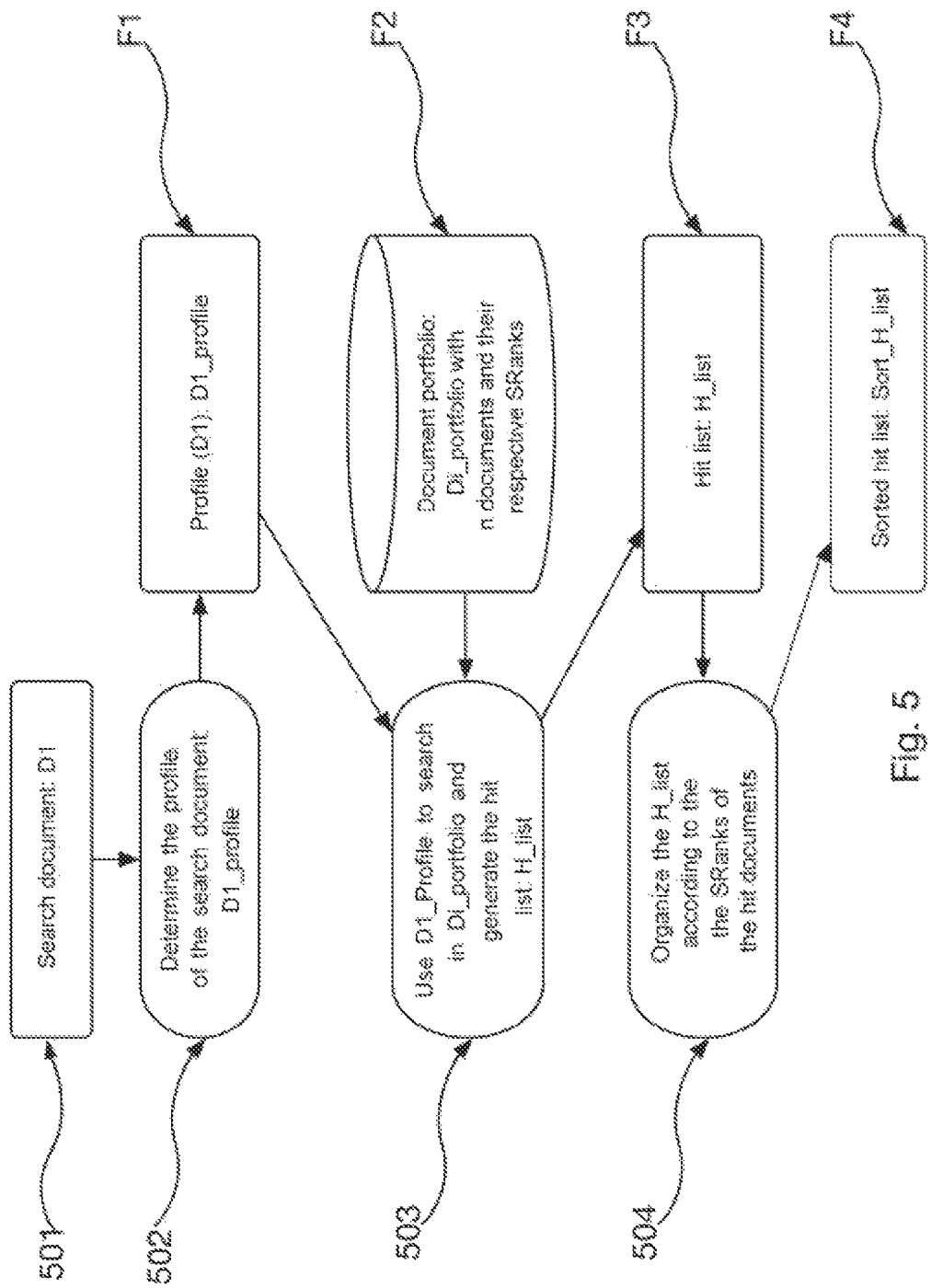
FIG. 5 shows a flowchart of an exemplary embodiment of a search with a profile and of ranking of the hit list using a relevance value determined according to the invention.

The invention is explained in more detail below using further exemplary embodiments. FIG. 5 shows a flowchart of a search with a profile and of ranking of the hit list using a relevance value determined according to the invention. The method comprises the following steps:

Step 501: A search document/text D1 is provided.

Step 502: The profile of D1 is generated, for example in accordance with the method in FIG. 3.

Step 503: D1_profile is used to search in the portfolio containing the documents D1. This is carried out, for example, in accordance with the methods in FIGS. 2 and 4. In accordance with the method according to FIG. 4, a similarity value S is determined for two documents in each case. On the basis of the similarity values and time stamps of the documents, the relevance value SRank for the document D1 is calculated according to FIG. 2. In this case, provision may be made for those documents which have at least one keyword matching the profile of D1 to be searched for in the portfolio containing the documents D1. For this purpose, the matching documents are identified, for example, in an inverse document index for each keyword of the profile of D1. If there is no matching keyword, the similarity value between the document D1 and the further document in each case is equal to zero, with the result that these documents do not need to be considered.

All matching documents (that is to say the documents which have at least one matching keyword with the profile of D1) result in a hit list H_list. The relevance value SRank is calculated for all documents in the hit list in the manner mentioned.

Step 504: The documents in the hit list are sorted according to the SRank. Alternatively, sorting is carried out taking into account further criteria. For example, a document in the hit list may first of all be ranked higher, the more similar it is to the search document. The SRank can then be additionally taken into account as a further criterion for the ranking list in this ranking, for example by additionally weighting the search results with the SRank.

Figure 6:
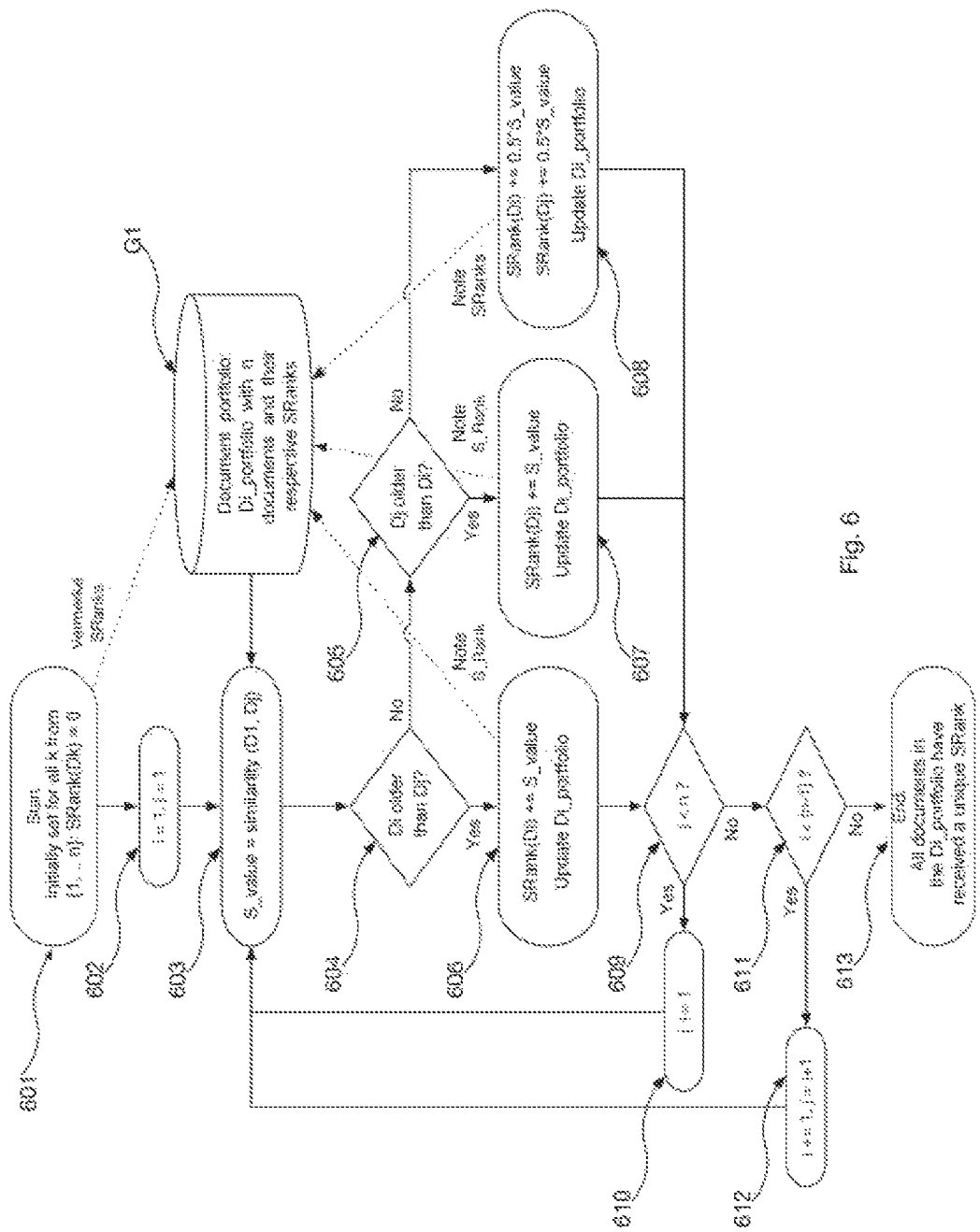
FIG. 6 shows a flowchart of an exemplary embodiment of the initial generation of the relevance values for all documents in an existing portfolio of documents.

FIG. 6 shows a flowchart of the initial generation of the relevance values for all documents in an existing portfolio of documents. The method comprises the following steps:

Steps 601-602: Initialization of the method.

Steps 603-608: These steps show the actual (incremental) determination of the SRank of two documents. In step 603, the similarity value S is determined in this case, for example, according to the exemplary embodiment in FIG. 4. However, the similarity value S may also be determined in another manner. According to steps 606-607, the similarity value is assigned in this case only to the older document in each case which has an earlier time stamp or was captured at an earlier time. Step 608 applies in this case only to the special case which does not occur in practice or occurs only extremely rarely in which both documents under consideration are of exactly the same age.

It is pointed out that steps 606-608 refer to "SRank(Di)" and "SRank(Dj)" for the purpose of simplification. The relevance value SRank results from the sum of the assigned similarity values of the individual comparisons. In steps 606-608, only an intermediate value of the reference value SRank is therefore indicated, to be precise an intermediate value which takes into account the similarity values of the individual comparisons until the document Dj.

Steps 609-611: These steps relate to the organization of the loop. If a document Di has been compared with all other documents, i and j are incremented by the value "1" in step 611.

Steps 602 and 609-611 may alternatively be replaced with the following construct: Carry out steps 603-608 for all i and j from $\{1, \ldots n\}$, with the condition i<j.

Figure 7:
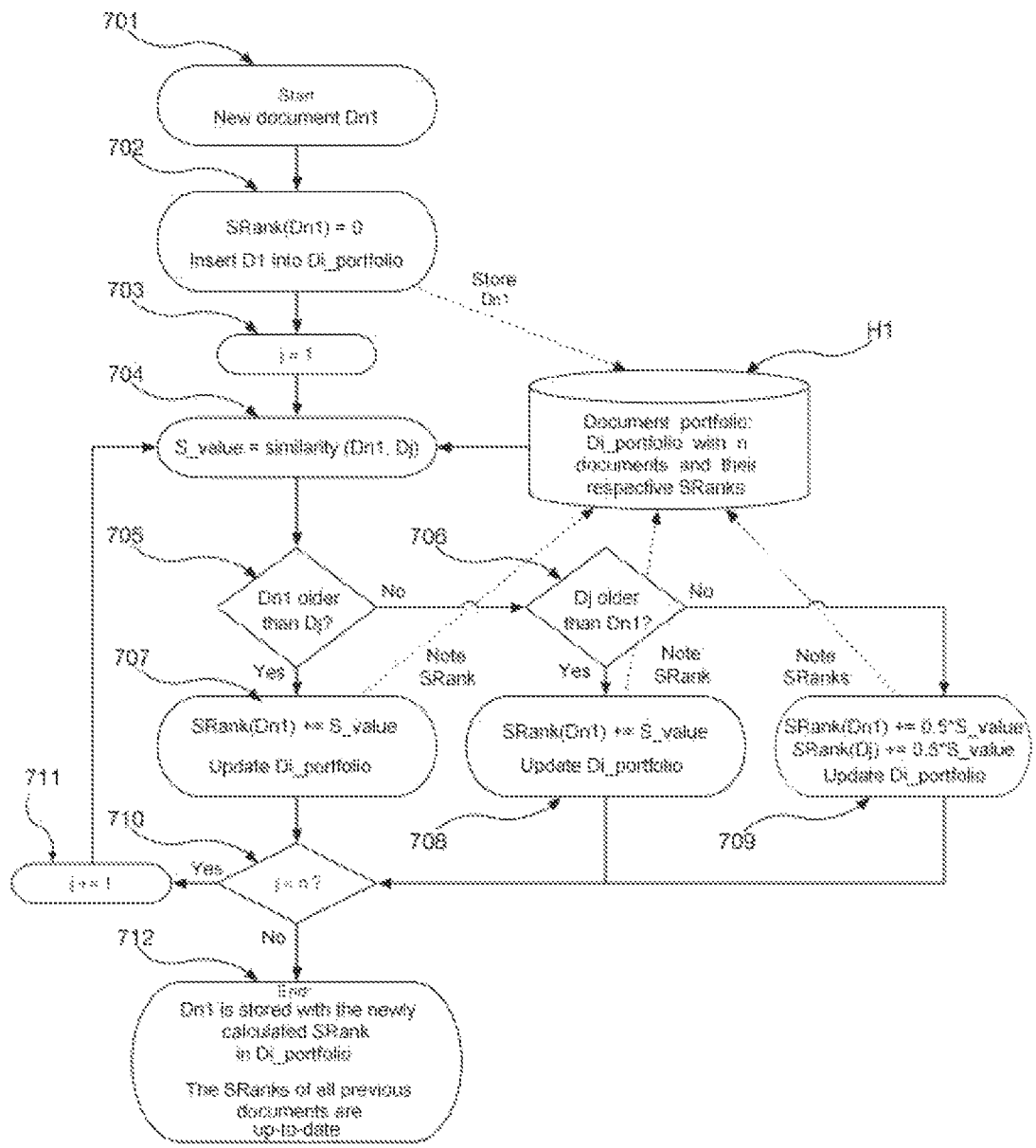
FIG. 7 shows a flowchart of an exemplary embodiment of the introduction of a new document into an existing portfolio of documents, including an update of the relevance values of all documents.

FIG. 7 shows a flowchart of introducing a new document into an existing portfolio of documents, including an update of the relevance values of all documents.

In this case, all existing SRanks of the portfolio of existing documents are initially taken as given and the SRank of the new document Dn1 is initially set to zero. In this case, method steps 704-709 correspond to method steps 603-608 in FIG. 6, wherein all previous documents D1 to Dn in the portfolio are run through and the SRank for the new document Dn1 is newly calculated for the respective older document.

It goes without saying that the invention is not restricted to the embodiments described above and various modifications and improvements can be made without departing from the concepts described here. It is also pointed out that any of the described features can be used separately or in combination with any other features provided that they are not mutually exclusive. The disclosure extends to and comprises all combinations and sub-combinations of one or more features described here. If ranges are defined, they comprise all values within these ranges and all sub-ranges which fall in a range.

The invention claimed is:

1. A method for determining the relevance of a text, the method comprising operations that include:

transmitting a text or data identifying the text from a communication end system to a computer system operable to manage a portfolio of texts stored in a database of the computer system, wherein a time the text was first published or was first captured by a capture system, and a profile, are stored in the database for each text, wherein the profile has been created on the basis of keywords of the respective text and keyword relevance values assigned to said keywords, prompting the computer system to check whether the received text is contained in the portfolio, based on a determination that the received text is not contained in the portfolio, creating, by the computer system, a profile of the received text and storing the profile of the received text, and the time the received text was first published or was first captured, in the database, prompting the computer system to determine a similarity of the received text to texts in the portfolio, wherein the received text is compared with each of the texts in the portfolio as part of an individual comparison while determining a similarity value indicating the similarity between the two texts compared in each case, wherein, in order to determine the similarity value of two texts, the profile stored in the database is retrieved and the similarity value is formed from the number of matching keywords and the keyword relevance values assigned to these keywords, wherein the similarity value is assigned at least to one of the two texts, in the respectively performed individual comparison, published or captured at an earlier time, wherein:

the similarity value of an individual comparison is assigned only to the one of the two texts published or captured at an earlier time, or the similarity value of an individual comparison is assigned to both texts in the respective individual comparison, and the similarity value is assigned to the one of the two texts, in the individual comparison, published or captured at a later time, with a lower weighting, calculating a relevance value from the similarity values determined in the individual comparisons and assigned to the text, and storing and/or transmitting the determined relevance value from the computer system to the communication end system and/or to another communication end system.

2. The method as claimed in claim 1, wherein the texts in the portfolio are arranged in a ranking list according to relevance values assigned to the texts, wherein the ranking list is transmitted from the computer system to the communication end system and/or to the another communication end system.

3. The method as claimed in claim 1, wherein, when the similarity of the text to a text in the portfolio, the similarity of the text being determined as part of an individual comparison, exceeds a threshold value, the similarity value is incremented by an additional value, wherein the similarity value incremented by the additional value is assigned at least to the text published at an earlier time.

4. The method as claimed in claim 1, wherein the determination of the similarity of the text to a text in the portfolio comprises:

determining keywords of the respective text, determining a keyword relevance value for each of the determined keywords, wherein in each case the keyword relevance value indicates a relevance of the keyword in the text respectively under consideration, and deriving the similarity value from a number of keywords matching in the two texts and the keyword relevance values assigned to these keywords.

5. The method as claimed in claim 4, wherein the determined keywords are names and/or nouns of the respective text.

6. The method as claimed in claim 4, wherein the frequency of the keywords in the respective text is determined, and wherein a frequency value is assigned to each keyword as one of the keyword relevance values for each keyword.

7. The method as claimed in claim 4, wherein a tf-idf measure is used as the keyword relevance value, wherein the keyword relevance value is equal to a product of a frequency value assigned to the respective keyword with an inverse text frequency in the texts in the portfolio.

8. The method as claimed in claim 4, wherein a normalized profile of the respective text is formed by using normalized keyword relevance values as the keyword relevance values, and the normalized keyword relevance values are generated from the keyword relevance values by dividing them by a normalization factor.

9. The method as claimed in claim 8, wherein the similarity value for two texts in an individual comparison is derived from the number of matching keywords and the normalized keyword relevance values assigned to the respective keywords by determining a sum of the mean values of the normalized keyword relevance values of the matching keywords.

10. The method as claimed in claim 8, wherein a filtered profile of the respective text is formed from the normalized profile of the respective text by using filtered keyword relevance values as the keyword relevance values, wherein the filtered keyword relevance values are formed from the normalized keyword relevance values by filtering the normalized keyword relevance value with a threshold value.

11. The method as claimed in claim 10, wherein the similarity value for two texts in an individual comparison is derived from the number of matching keywords and the filtered keyword relevance values assigned to the respective keywords by determining the sum of the mean values of the filtered keyword relevance values of the matching keywords.

12. The method as claimed in claim 1, wherein the texts in the portfolio are stored in a database, wherein the following are stored for each text:

the time the text was first published or was first captured by a capture system, and the profile of the text, where the profile of the text was produced by:

capturing keywords of the text, determining a keyword relevance value for each of the determined keywords, and the keyword relevance value indicates the relevance of the keyword in the text under consideration.

13. The method as claimed in claim 12, wherein normalized keyword relevance values and/or filtered keyword relevance values are stored in the database as keyword relevance values.

14. The method as claimed in claim 12, wherein, in order to determine a similarity of two texts, the profile is retrieved and the similarity value is formed from the number of matching keywords and keyword relevance values assigned to the respective keywords.

15. The method as claimed in claim 12, wherein the relevance value of the text is additionally stored in the database.

16. The method as claimed in claim 1, wherein the method is applied to all texts in the portfolio, wherein a relevance value is determined for each text in the portfolio.

17. The method as claimed in claim 1, wherein the method is carried out consecutively for a plurality of texts of a document, wherein for each individual text a relevance value is determined, wherein an overall relevance value is calculated from the relevance values resulting for the individual texts.

18. The method as claimed in claim 1, wherein the time a text was first published is defined by a time stamp of the text, and/or the time a text was first captured by a capture system is defined by the time the text was first captured by a web crawler.

19. A non-transitory storage medium having stored therein instructions that are executable by one or more hardware processors to perform the operations recited in claim 1.

\* \* \* \* \*